US009411187B2

(12) United States Patent
Lee et al.

(10) Patent No.: US 9,411,187 B2
(45) Date of Patent: Aug. 9, 2016

(54) DISPLAY DEVICE AND MANUFACTURING METHOD THEREOF

(71) Applicant: Samsung Display Co., Ltd., Yongin (KR)

(72) Inventors: Hyoung Sub Lee, Yongin-si (KR); Seung-Yeon Chae, Hwaseong-si (KR); Joo Young Yoon, Suwon-si (KR); Chung Sock Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/663,552

(22) Filed: Mar. 20, 2015

(65) Prior Publication Data

US 2016/0109746 A1    Apr. 21, 2016

(30) Foreign Application Priority Data

Oct. 21, 2014    (KR) ........................ 10-2014-0142529

(51) Int. Cl.
| G02F 1/1339 | (2006.01) |
| G02F 1/1333 | (2006.01) |
| G02F 1/1368 | (2006.01) |
| G02F 1/1341 | (2006.01) |
| G02F 1/1337 | (2006.01) |
| G02F 1/1334 | (2006.01) |

(52) U.S. Cl.
CPC ........ *G02F 1/133345* (2013.01); *G02F 1/1334* (2013.01); *G02F 1/1337* (2013.01); *G02F 1/1341* (2013.01); *G02F 1/1368* (2013.01); *G02F 1/13394* (2013.01); *G02F 1/133377* (2013.01)

(58) Field of Classification Search
CPC .......................... G02F 1/1344; G02F 1/13394
See application file for complete search history.

(56) References Cited

FOREIGN PATENT DOCUMENTS

| KR | 10-2007-0050451 | 5/2007 |
| KR | 10-2009-0015991 | 2/2009 |
| KR | 10-2013-0141097 | 12/2013 |

OTHER PUBLICATIONS

Zhengmao Yin "Light transmission enhancement from hybrid ZnO micro-mesh and nanorod arrays with application to GaN-based light-emitting diodes" Optics Express, pp. 28531-28542, vol. 21, No. 23, 2013.
Ji Hye Kang "Comparison of various surface textured layer in InGaN LEDs for high light extraction efficiency" Optics Express 19(4), 3637-3647, 2011.

*Primary Examiner* — Phu Vu
(74) *Attorney, Agent, or Firm* — H.C. Park & Associates, PLC

(57) ABSTRACT

A display device includes a substrate including pixel areas, a thin-film transistor disposed on the substrate, a first insulating layer disposed on the thin-film transistor, a pixel electrode disposed on the first insulating layer and connected to the thin-film transistor, a liquid crystal layer filling a microcavity disposed on the pixel electrode, a common electrode spaced apart from the pixel electrode by the microcavity, a roof layer disposed on the common electrode, an injection hole disposed in the common electrode and the roof layer, the injection hole partially exposing the microcavity, a third insulating layer disposed on the roof layer, and an overcoat disposed on the third insulating layer and sealing the microcavity by covering the injection hole, wherein a first convex embossing pattern is formed on an upper surface of the third insulating layer.

20 Claims, 14 Drawing Sheets

DISPLAY DEVICE AND MANUFACTURING METHOD THEREOF

CROSS-REFERENCE TO RELATED APPLICATION

This application claims priority from and the benefit of Korean Patent Application No. 10-2014-0142529, filed on Oct. 21, 2014, which is hereby incorporated by reference for all purposes as if fully set forth herein.

BACKGROUND

1. Field

Exemplary embodiments of the present invention relate to a display device and a manufacturing method thereof. More particularly, exemplary embodiments of the present invention relate to a display device with increased light efficiency, and a method for manufacturing the same.

2. Discussion of the Background

Display devices may be required for computer monitors, televisions, mobile phones, and the like. The display devices may include a cathode ray tube display device, a liquid crystal display, a plasma display device, and the like.

The liquid crystal display may include two sheets of display panels including field generating electrodes such as a pixel electrode, a common electrode, and a liquid crystal layer interposed therebetween. The liquid crystal display may generate an electric field in the liquid crystal layer by applying a voltage to the field generating electrodes to align liquid crystal molecules of the liquid crystal layer, and control polarization of incident light to display images.

Two sheets of display panels of the liquid crystal display may include a thin-film transistor array panel and an opposing display panel. The thin-film transistor array panel may include a gate line transferring a gate signal, a data line transferring a data signal and crossing the gate line, a thin-film transistor connected to the gate line and the data line, and a pixel electrode connected to the thin-film transistor. The opposing display panel may include a light blocking member, a color filter, and a common electrode. In some cases, the light blocking member, the color filter, and the common electrode may be formed on the thin-film transistor array panel.

However, a liquid crystal display including two sheets of substrates may form respective constituent elements on the two sheets of substrates, which may increase weight, thickness, cost, and processing time of the display device.

In addition, light efficiency of light emitted from a backlight may decrease in a structure including multiple layers having different refractive indices from each other.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a display device including an insulating layer where various shapes of patterns may be formed therein to increase light efficiency, and a method for manufacturing the same.

Additional aspects will be set forth in the detailed description which follows, and, in part, will be apparent from the disclosure, or may be learned by practice of the inventive concept.

According to an exemplary embodiment of the present invention, a display device includes a substrate including pixel areas, a thin-film transistor disposed on the substrate, a first insulating layer disposed on the thin-film transistor, a pixel electrode disposed on the first insulating layer and connected to the thin-film transistor, a liquid crystal layer filling a microcavity disposed on the pixel electrode, a common electrode spaced apart from the pixel electrode by the microcavity, a roof layer disposed on the common electrode, an injection hole disposed in the common electrode and the roof layer, the injection hole partially exposing the microcavity, a third insulating layer disposed on the roof layer, and an overcoat disposed on the third insulating layer and sealing the microcavity by covering the injection hole, in which a first convex embossing pattern is formed on an upper surface of the third insulating layer.

The third insulating layer may include an inorganic layer.

The third insulating layer may include at least one of a silicon nitride (SiNx), a silicon oxide (SiOx), and a silicon oxynitride (SiOxNy).

The overcoat may include a material having a refractive index lower than a refractive index the third insulating layer.

The first convex embossing pattern may have one or more of a semicircle, a triangle, and a quadrangle shape.

The display device may further include a refractive index easing layer disposed between the third insulating layer and the overcoat, in which a second convex embossing pattern is disposed on an upper surface of the refractive index easing layer.

A refractive index of the refractive index easing layer may be lower than the refractive index the third insulating layer and higher than a refractive index of the overcoat.

The refractive index easing layer may include a transparent conductive oxide.

The transparent conductive oxide may include indium zinc oxide (IZO), indium tin oxide (ITO), aluminum doped zinc oxide (AZO), or fluorine doped tin oxide (FTO).

The second convex embossing pattern may have one or more of a semicircle, a triangle, and a quadrangle shape.

The second convex embossing pattern may include a nanowire.

The display device may further include a second insulating layer disposed between the common electrode and the roof layer, and an alignment layer disposed in the microcavity and the entire surface of the injection hole.

According to an exemplary embodiment of the present invention, a method for manufacturing a display device includes forming a thin-film transistor on a substrate, forming a first insulating layer on the thin-film transistor, forming a pixel electrode on the first insulating layer, the pixel electrode being connected to the thin-film transistor, forming a sacrificial layer on the pixel electrode, forming a common electrode on the sacrificial layer, forming a roof layer by coating an organic material to the common electrode and patterning the coated organic material, exposing the sacrificial layer by patterning the common electrode using the roof layer as a mask, forming a third insulating layer on the roof layer, forming a microcavity and an injection hole between the pixel electrode and the common electrode by removing the exposed sacrificial layer, forming a first convex embossing pattern in an upper surface of the third insulating layer, forming a liquid crystal layer by injecting a liquid crystal material into the microcavity, and sealing the microcavity by forming an overcoat on the third insulating layer and the injection hole.

The method may further include after forming the first convex embossing pattern on in the third insulating layer, disposing a refractive index easing layer on the third insulating layer, and forming a second convex embossing pattern on an upper surface of the refractive index easing layer.

The forming of the second convex embossing pattern on the refractive index easing layer may include growing a nanowire in a surface of the refractive index easing layer.

According to the exemplary embodiments of the present invention, light efficiency may be improved by disposing an insulating layer including various patterns to increase a critical angle of light that may pass through layers.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
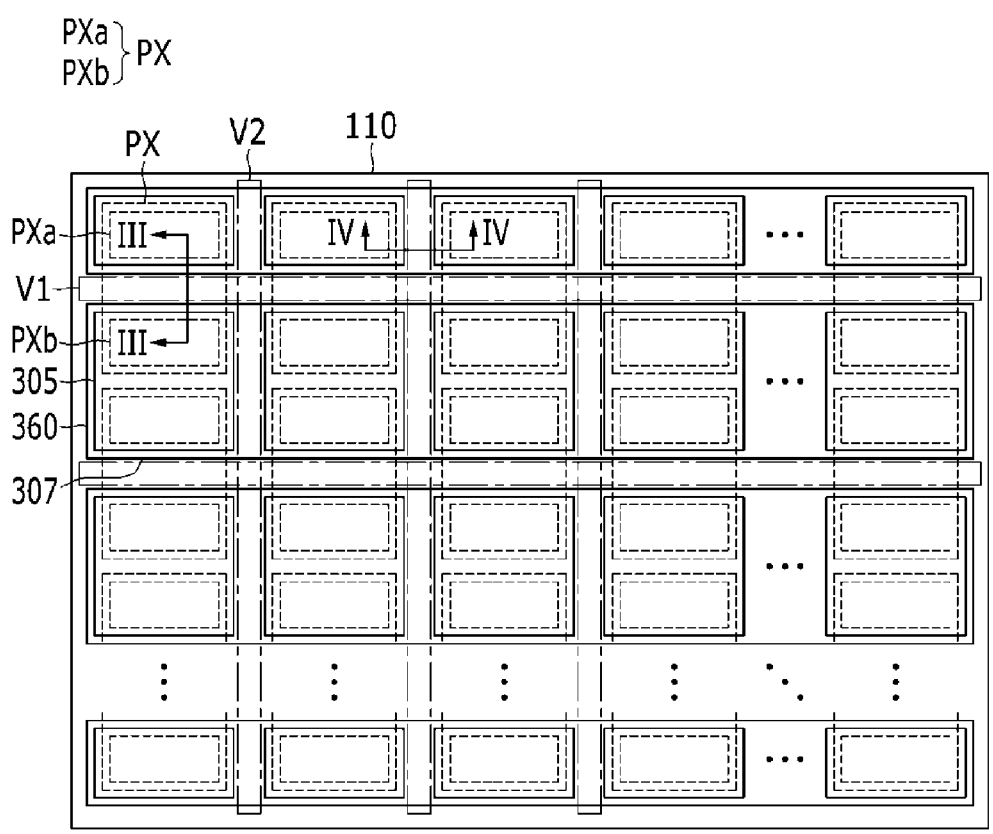
FIG. 1 is a top plan view of a display device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A display device according to an exemplary embodiment of the present invention will be schematically described with reference to FIG. 1.

FIG. 1 is a top plan view of a display device according to an exemplary embodiment of the present invention.

Referring to FIG. 1, a display device according to an exemplary embodiment of the present invention may include a substrate 110 including a material such as glass or plastic, and a roof layer 360 formed on the substrate 110.

The substrate 110 includes pixel areas PX. The pixel areas PX may include pixel rows and pixel columns disposed in a matrix form. Each pixel area PX may include a first subpixel area PXa and a second subpixel area PXb. The first subpixel area PXa and the second subpixel area PXb may be disposed along a vertical direction.

A first valley V1 may be arranged between the first subpixel area PXa and the second subpixel area PXb along a pixel row direction, and a second valley V2 may be arranged between pixel columns.

The roof layer 360 may be formed along the pixel row direction. A portion of the roof layer 360 overlapping the first valley V1 may be removed to form an injection hole 307 thereon, so that constituent elements disposed below the roof layer 360 may be exposed.

Each roof layer 360 may be spaced apart from the substrate 110 between adjacent second valleys V2 to form a microcavity 305, and be attached to the substrate 110 at the second valley V2 to cover both sides of the microcavity 305.

According to an exemplary embodiment of the present invention, a layout of the pixel area PX, the first valleys V1, and the second valleys V2 may be modified. The roof layers 360 may be connected to each other at the first valleys V1, and a portion of each roof layer 360 may be separated from the substrate 110 at the second valley V2 so that the adjacent microcavities 305 may be connected to each other.

Next, one pixel of the display device according to an exemplary embodiment of the present invention will be described below with reference to FIG. 1 to FIG. 4.

Figure 2:
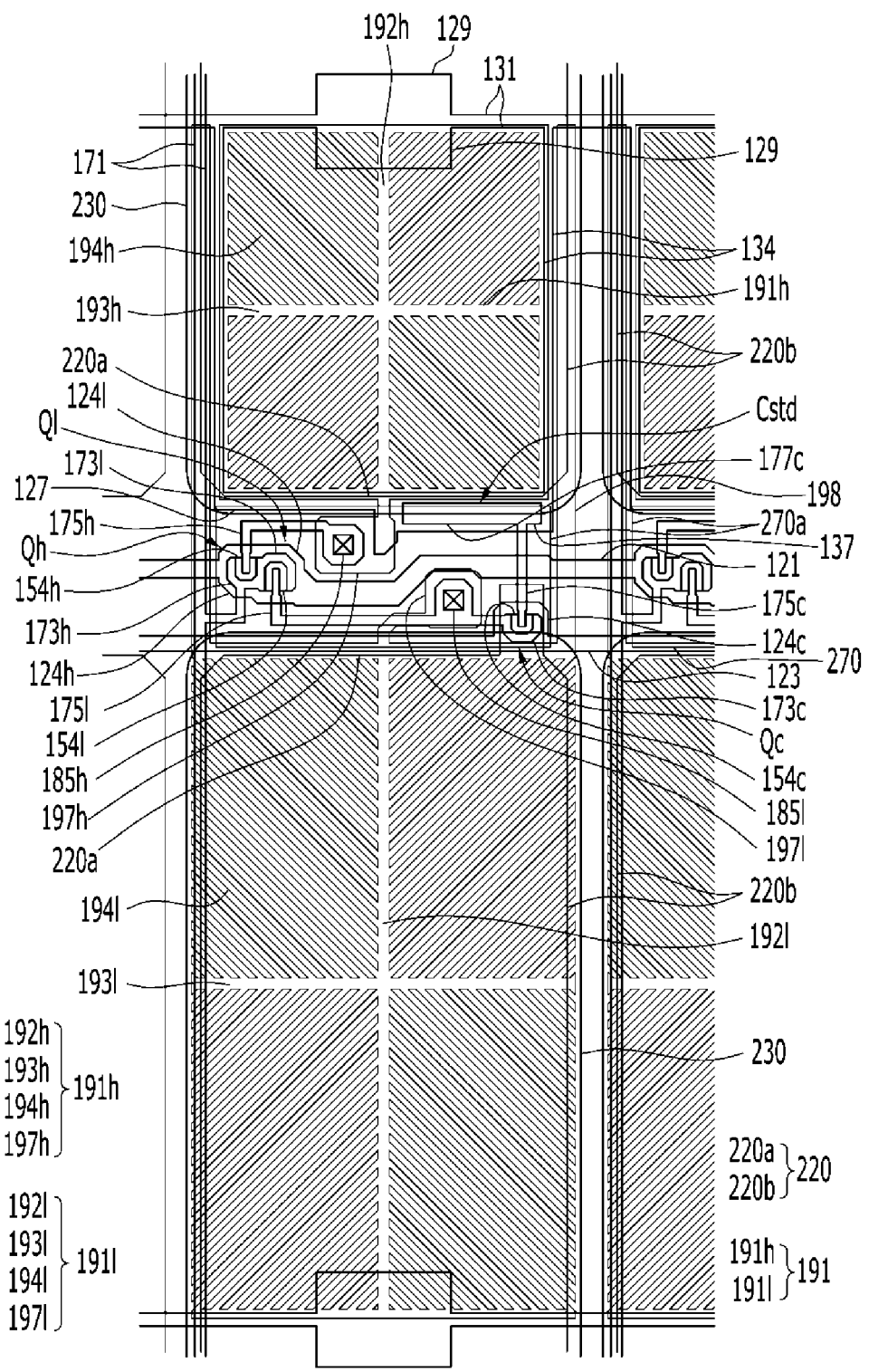
FIG. 2 is a top plan view of a pixel of the display device according to an exemplary embodiment of the present invention.
Figure 3:
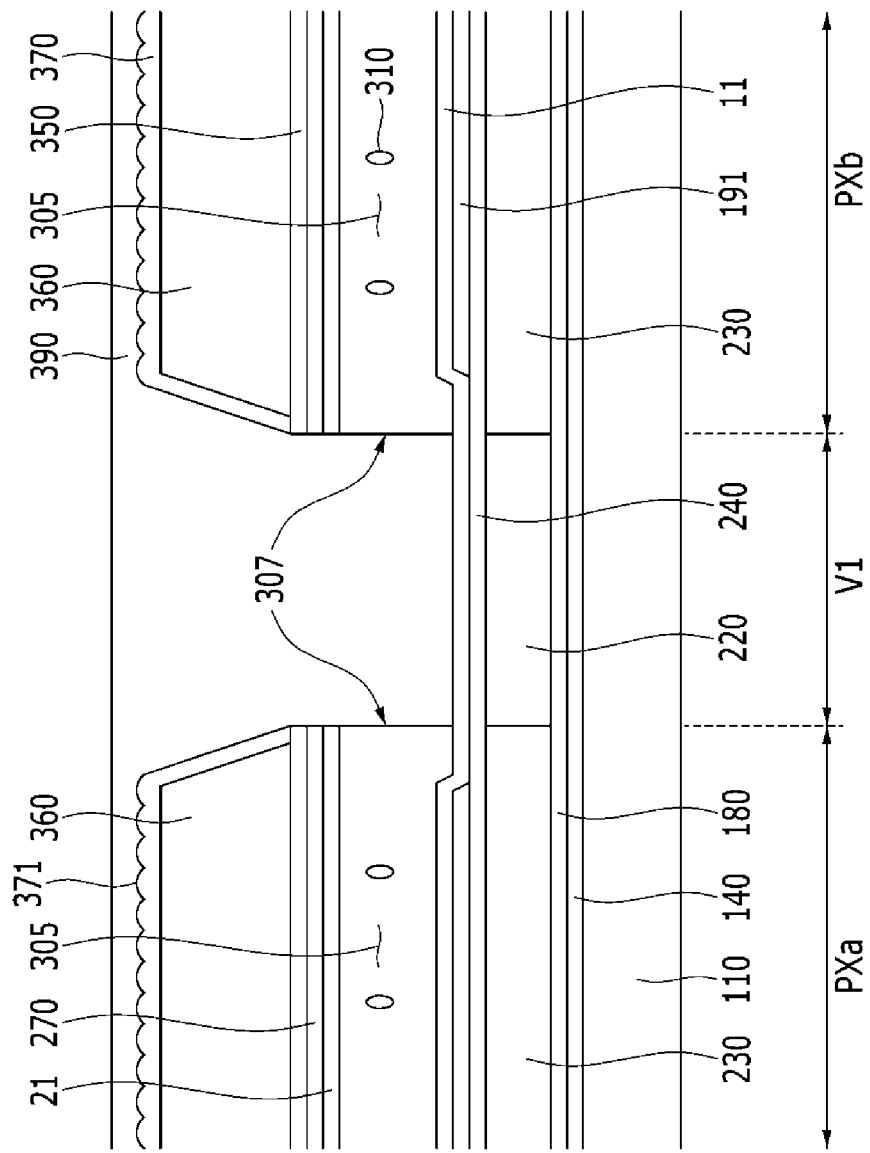
FIG. 3 is a cross-sectional view of FIG. 1, taken along the line III-III.
Figure 4:
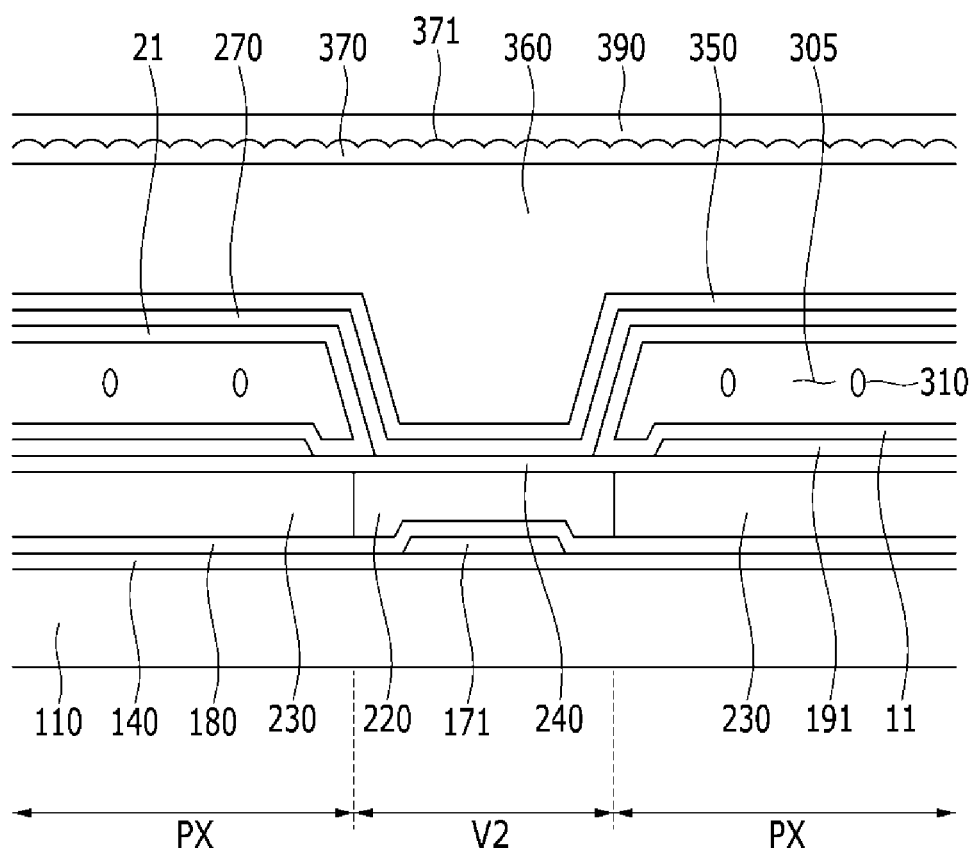
FIG. 4 is a cross-sectional view of FIG. 1, taken along the line IV-IV.

FIG. 2 is a top plan view of a display device according to an exemplary embodiment of the present invention, FIG. 3 is a cross-sectional view of FIG. 1, taken along the line III-III, and FIG. 4 is a cross-sectional view of FIG. 1, taken along the line IV-IV.

Referring to FIG. 1 to FIG. 4, gate conductors including gate lines 121, step-down gate lines 123, and storage electrode lines 131 may be formed on the substrate 110.

The gate line 121 and the step-down gate line 123 may extend along a horizontal direction to transfer gate signals. The gate conductor may further include a first gate electrode 124h, a second gate electrode 124l protruding upward and downward from the gate line 121, and a third gate electrode 124c protruding upward from the step-down gate line 123. The first gate electrode 124h and the second gate electrode 124l may be connected to each other to form one protrusion. The protrusion form of the first, second, and third gate electrodes 124h, 124l, and 124c may be modified.

The storage electrode line 131 may extend along a horizontal direction and transfer a voltage such as a common voltage Vcom. The storage electrode line 131 includes storage electrodes 129 protruding upward and downward, a pair of vertical portions 134 extending downward to be substantially vertical to the gate line 121, and a horizontal portion 127 connecting ends of the pair of vertical portions 134. The horizontal portion 127 includes a capacitor electrode 137 expanding downward.

A gate insulating layer 140 may be formed on the gate conductors 121, 123, 124h, 124l, 124c, and 131. The gate insulating layer 140 may include an inorganic insulating material such as a silicon nitride (SiNx) and a silicon oxide (SiOx). Further, the gate insulating layer 140 may be formed as a single layer or a multiple layer.

A first semiconductor 154h, a second semiconductor 154l, and a third semiconductor 154c may be formed on the gate insulating layer 140. The first semiconductor 154h may be arranged on the first gate electrode 124h, the second semiconductor 154l may be arranged on the second gate electrode 124l, and the third semiconductor 154c may be arranged on the third gate electrode 124c. The first semiconductor 154h and the second semiconductor 154l may be connected to each other, and the second semiconductor 154l and the third semiconductor 154c may be connected to each other. In this case, the first semiconductor 154h may extend to the lower portion of a data line 171. The first to third semiconductors 154h, 154l, and 154c may include amorphous silicon, polycrystalline silicon, a metal oxide, and the like.

An ohmic contact (not illustrated) may be further formed on each of the first to third semiconductors 154h, 154l, and 154c. The ohmic contact may include silicide or a material such as n+ hydrogenated amorphous silicon in which an n-type impurity is doped at a high concentration.

The data line 171 may transfer a data signal, and extend along a vertical direction to cross the gate line 121 and the step-down gate line 123. Each data line 171 may extend toward the first gate electrode 124h and the second gate electrode 124l, and include a first source electrode 173h and a second source electrode 173l that are connected to each other.

Each of a first drain electrode 175h, a second drain electrode 175l, and a third drain electrode 175c may include one wide end portion and the rod-shaped end portion. The rod-shaped end portions of the first drain electrode 175h and the second drain electrode 175l may be partially surrounded by the first source electrode 173h and the second source electrode 173l, respectively. One wide end portion of the second drain electrode 175l may extend to form a third source electrode 173c, which is bent in a 'U'-shape. A wide end portion 177c of the third drain electrode 175c may overlap the capacitor electrode 137 to form a step-down capacitor Cstd, and the rod-shaped end portion is partially surrounded by the third source electrode 173c.

The first gate electrode 124h, the first source electrode 173h, and the first drain electrode 175h may form a first thin-film transistor Qh together with the first semiconductor 154h. The second gate electrode 124l, the second source electrode 173l, and the second drain electrode 175l may form a second thin-film transistor Ql together with the second semiconductor 154l, and the third gate electrode 124c. The third source electrode 173c, and the third drain electrode 175c may form a third thin-film transistor Qc together with the third semiconductor 154c.

The first semiconductor 154h, the second semiconductor 154l, and the third semiconductor 154c may be connected to each other to have a linear shape, and may have substantially the same planar shape as the data conductors 171, 173h, 173l, 173c, 175h, 175l, and 175c, and the ohmic contacts therebelow, except for channel regions between the source electrodes 173h, 173l, and 173c and the drain electrodes 175h, 175l, and 175c.

In the first semiconductor 154h, an exposed portion not covered by the first source electrode 173h and the first drain electrode 175h may be disposed between the first source electrode 173h and the first drain electrode 175h. In the second semiconductor 154l, an exposed portion not covered by the second source electrode 173l and the second drain electrode 175l may be disposed between the second source electrode 173l and the second drain electrode 175l. In the third semiconductor 154c, an exposed portion not covered by the third source electrode 173c and the third drain electrode 175c may be disposed between the third source electrode 173c and the third drain electrode 175c.

A passivation layer 180 may be formed on the data conductors 171, 173h, 173l, 173c, 175h, 175l, and 175c, and the semiconductors 154h, 154l, and 154c exposed between the respective source electrodes 173h, 173l, and 173c and the respective drain electrodes 175h, 175l, and 175c. The passivation layer 180 may include an organic insulating material or an inorganic insulating material, and may be formed as a single layer or a multiple layer.

A color filter 230 in each pixel area PX may be formed on the passivation layer 180. Each color filter 230 may display one of the primary colors, such as three primary colors of red, green, and blue. Alternatively, the color filter 230 may display cyan, magenta, yellow, white-based colors, and the like. Alternatively, the color filter 230 may be elongated in a column direction along a space between the adjacent data lines 171.

A light blocking member 220 may be formed in a region between the adjacent color filters 230. The light blocking member 220 may be formed on a boundary of the pixel area PX and the thin-film transistor to prevent light leakage. The color filter 230 may be formed in each of the first subpixel area PXa and the second subpixel area PXb, and the light blocking member 220 may be formed between the first subpixel area PXa and the second subpixel area PXb.

The light blocking member 220 may include a horizontal light blocking member 220a that extends along the gate line 121 and the step-down gate line 123 to expand upward and downward and cover regions in which the first thin-film transistor Qh, the second thin-film transistor Ql, and the third thin-film transistor Qc are positioned. The light blocking member 220 may also include a vertical light blocking member 220b that extends along the data line 171. More particularly, the horizontal light blocking member 220a may be formed at the first valley V1, and the vertical light blocking member 220b may be formed at the second valley V2. The color filter 230 and the light blocking member 220 may overlap each other in a partial region.

A first insulating layer 240 may be further formed on the color filter 230 and the light blocking member 220. The first insulating layer 240 may include an inorganic insulating material such as a silicon nitride (SiNx), a silicon oxide (SiOx), and a silicon oxynitride (SiOxNy). The first insulating layer 240 may protect the color filter 230 made of the organic material and the light blocking member 220. The first insulating layer 240 may be omitted.

In the first insulating layer 240, the light blocking member 220, the passivation layer 180, first contact holes 185h, and second contact holes 185l, which expose the wide end portion of the first drain electrode 175h and the wide end portion of the second drain electrode 175l, respectively, may be formed.

A pixel electrode 191 may be formed on the first insulating layer 240. The pixel electrode 191 may be made of a transparent metal material such as indium tin oxide (ITO) and indium zinc oxide (IZO).

The pixel electrode 191 may include a first subpixel electrode 191h and a second subpixel electrode 191l spaced apart from each other with the gate line 121 and the step-down gate line 123 therebetween, and may be disposed above and below the pixel area PX based on the gate line 121 and the step-down gate line 123, to be adjacent to each other in a column direction. More particularly, the first subpixel electrode 191h and the second subpixel electrode 191l may be spaced apart from each other with the first valley V1 therebetween. The first subpixel electrode 191h may be arranged in the first subpixel area PXa, and the second subpixel electrode 191l may be arranged in the second subpixel area PXb.

The first subpixel electrode 191h and the second subpixel electrode 191l may be connected to the first drain electrode 175h and the second drain electrode 175l through the first contact hole 185h and the second contact hole 185l, respectively. Accordingly, when the first thin-film transistor Qh and the second thin-film transistor Ql are turned on, the first thin-film transistor Qh and the second thin-film transistor Ql may receive data voltages from the first drain electrode 175h and the second drain electrode 175l.

Each of the first subpixel electrode 191h and the second subpixel electrode 191l may have quadrangle shape, and the first subpixel electrode 191h and the second subpixel electrode 191l may include cross stems including horizontal stems 193h and 193l and vertical stems 192h and 192l crossing the horizontal stems 193h and 193l, respectively. Further, the first subpixel electrode 191h and the second subpixel electrode 191l may include minute branches 194h and 194l, and protrusions 197h and 197l protruding downward or upward from edge sides of the subpixel electrodes 191h and 191l, respectively.

The pixel electrode 191 may be divided into four sub-regions by the horizontal stems 193h and 193l and the vertical stems 192h and 192l. The minute branches 194h and 194l may obliquely extend from the horizontal stems 193h and 193l and the vertical stems 192h and 192l, and the extending direction may form an angle of about 45 degrees or about 135 degrees with the gate line 121 or the horizontal stems 193h and 193l. Further, directions in which the minute branches 194h and 194l of the two adjacent sub-regions extend may be perpendicular to each other.

In an exemplary embodiment of the present invention, the first subpixel electrode 191h may further include an outer stem surrounding the outside, and the second subpixel electrode 191l may further include horizontal portions arranged at an upper end and a lower end, and left and right vertical portions 198 arranged at the left and right of the first subpixel electrode 191h. The left and right vertical portions 198 may prevent capacitive coupling, that is, coupling between the data line 171 and the first subpixel electrode 191h.

The layout form of the pixel area, the structure of the thin film transistor, and the shape of the pixel electrode described above may be variously modified.

A common electrode 270 may be formed on the pixel electrode 191 to be spaced apart from the pixel electrode 191 at a predetermined distance. The microcavity 305 may formed between the pixel electrode 191 and the common electrode 270. More particularly, the microcavity 305 may be surrounded by the pixel electrode 191 and the common electrode 270. A width and an area of the microcavity 305 may be variously modified according to a size and a resolution of the display device.

The common electrode 270 may include a transparent metal material such as indium tin oxide (ITO) and indium zinc oxide (IZO). A voltage may be applied to the common electrode 270, and an electric field may be generated between the pixel electrode 191 and the common electrode 270.

A first alignment layer 11 may be formed on the pixel electrode 191. The first alignment layer 11 may also be formed directly on the first insulating layer 240 that is not covered by the pixel electrode 191.

When the first insulating layer 240 is omitted, the first alignment layer 10 may be formed directly on the color filter 230 and the light blocking member 220, which are not covered by the pixel electrode 191.

A second alignment layer 21 may be formed below the common electrode 270 to face the first alignment layer 11.

The first alignment layer 11 and the second alignment layer 21 may be formed as vertical alignment layers, and may include alignment materials such as polyamic acid, polysiloxane, and polyimide. The first and second alignment layers 11 and 21 may be connected to each other at an edge of the pixel area PX.

A liquid crystal layer including liquid crystal molecules 310 may be formed in the microcavity 305 arranged between the pixel electrode 191 and the common electrode 270. The liquid crystal molecules 310 may have negative dielectric anisotropy, and may be aligned in a vertical direction with respect to the substrate 110 when the electric field is not applied. More particularly, vertical alignment may be performed.

The first subpixel electrode 191h and the second subpixel electrode 191l to which the data voltages are applied may generate an electric field together with the common electrode 270, to determine alignment directions of the liquid crystal molecules 310 arranged in the microcavity 305 between the two electrodes 191 and 270. Luminance of light passing through the liquid crystal layer may vary according to the alignment directions of the liquid crystal molecules 310.

A second insulating layer 350 may be further formed on the common electrode 270. The second insulating layer 350 may include an inorganic insulating material such as a silicon nitride (SiNx) and a silicon oxide (SiOx). The second insulating layer 350 may be omitted.

The roof layer 360 may be formed on the second insulating layer 350. The roof layer 360 may include an organic material. The microcavity 305 may be formed below the roof layer 360, and the roof layer 360 may be hardened by a curing process to maintain the shape of the microcavity 305. More particularly, the roof layer 360 may be formed to be spaced apart from the pixel electrode 191 with the microcavity 305 therebetween.

The roof layer 360 may be formed in each pixel area PX along a pixel row and at the second valley V2, but the roof layer 360 may not be formed at the first valley V1. More particularly, the roof layer 360 may not be formed between the first subpixel area PXa and the second subpixel area PXb. The microcavity 305 may be formed below each roof layer 360 at each of the first subpixel area PXa and the second subpixel area PXb. In the second valley V2, the microcavity 305 may not be formed below the roof layer 360, but formed to be attached to the substrate 110. In the second valley V2, the microcavity 305 may not be formed below the roof layer 360, but formed to be attached to the substrate 110. The roof layer 360 may cover the upper surface and both sides of the microcavity 305.

When the roof layer 360 is not located in the first valley region V1, the roof layers 360 may be spaced apart from each other, interposing the first valley area V1 therebetween.

Accordingly, the roof layer 360 in an adjacent area of the first valley region V1 may be inclined, and thus may have an inclined surface.

The injection hole 307 exposing a portion of the microcavity 305 may be formed in the common electrode 270, the second insulating layer 350, and the roof layer 360. Injection holes 307 may be formed to face each other at the edges of the first subpixel area PXa and the second subpixel area PXb. More particularly, the injection holes 307 may be formed to correspond to the lower side of the first subpixel area PXa and the upper side of the second subpixel area PXb so as to expose a side of the microcavity 305. Since the microcavity 305 may be exposed by the injection hole 307, an aligning agent, a liquid crystal material, or the like may be injected into the microcavity 305 through the injection hole 307.

A third insulating layer 370 may be formed on the roof layer 360. The third insulating layer 370 may include an inorganic insulating material such as a silicon nitride (SiNx), a silicon oxide (SiOx), and a silicon oxynitride (SiOxNy).

An overcoat 390 may be formed on the third insulating layer 370. The overcoat 390 may cover the liquid crystal injection hole 307 that exposes a portion of the microcavity 305 to the outside. More particularly, the overcoat 390 may seal the microcavity 305 so that the liquid crystal molecules 310 formed in the microcavity 305 may not be discharged outside. Since the overcoat 390 may contact the liquid crystal molecules 310, the overcoat 390 may include a material that does not react with the liquid crystal molecules 310. For example, the overcoat 390 may include parylene and the like.

The overcoat 390 may be formed as a multilayer such as a double layer and a triple layer. The double layer may include two layers made of different materials. The triple layer may include three layers, and materials of adjacent layers may be different from each other. For example, the overcoat 390 may include layers including an organic insulating material and an inorganic insulating material.

The third insulating layer 370 according to an exemplary embodiment of the present invention may include a first convex embossing pattern 371 that is convex toward the upper surface of the third insulating layer 370.

The third insulating layer 370 and the overcoat 390 layered on the third insulating layer 370 may have different refractive indices. When light passes through layers having a different refractive index from each other, a range of angle that the light may pass is referred to as a critical angle. In general, the critical angle may decrease when light passes from a layer having a high refractive index to a layer having a low refractive index. The critical angle may further decrease when a refractive index difference between the layers increases, such that light incident with an angle that exceeds the critical angle may not pass through the layers, thereby decreasing light efficiency of a display device.

As previously described, the inorganic insulating material such as a silicon nitride (SiNx), a silicon oxide (SiOx), a silicon oxynitride (SiOxNy), which may be included in the third insulating layer 370, may have a higher refractive index than a material such as parylene that may be included in the overcoat 390. Accordingly, a critical angle for transmission of light passing through the third insulating layer 370 may be generated. In addition, as the refractive index difference between the third insulating layer 370 and the overcoat 390 is increased, the critical angle may decrease further, which decreases light efficiency of a display device.

Thus, the first convex embossing pattern 371 may be formed in the third insulating layer 370 to increase the critical angle of light passing through the upper surface of the third insulating layer 370 and a lower surface of the overcoat 390, which may increase light efficiency of the entire display device compared to a display device including the third insulating layer 370 without the first convex embossing pattern 371.

A cross-section of the first convex embossing pattern 371 formed in the upper surface of the third insulating layer 370 according to an exemplary embodiment of the present invention may have a semicircle shape, and thus the first convex embossing pattern 371 may include an embossing shape in the entire upper surface of the third insulating layer 370.

Although not illustrated, polarizers may be further formed on upper and lower surfaces of the liquid crystal display. The polarizers may include a first polarizer and a second polarizer. The first polarizer may be attached onto the lower surface of the substrate 110, and the second polarizer may be attached onto the color filter 230.

Next, a method for manufacturing a display device according to an exemplary embodiment of the present invention will be described with reference to FIG. 5 to FIG. 10 and FIG. 1 to FIG. 4.

FIG. 5 to FIG. 10 are cross-sectional views of a manufacturing method of a display device according to an exemplary embodiment of the present invention.

Figure 5:
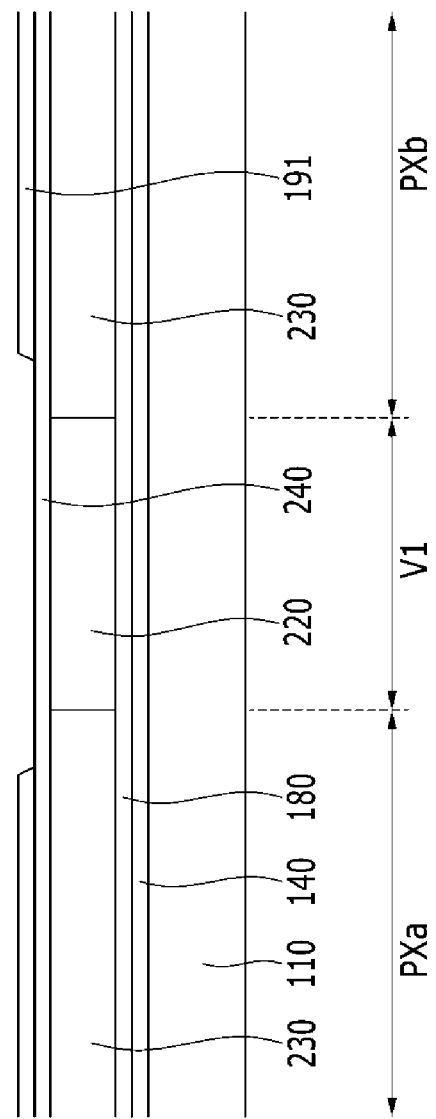
FIG. 5 to FIG. 10 are cross-sectional views of a manufacturing method of a display device according to an exemplary embodiment of the present invention.

Referring to FIG. 1 and FIG. 5, a gate line 121 and a step-down gate line 123 extending in a first direction may be formed on a substrate 110 made of glass or plastic, and a first gate electrode 124h, a second gate electrode 124l, and a third gate electrode 124c which protrude from the gate line 121 may be formed.

Further, a storage electrode line 131 may be formed together so as to be spaced apart from the gate line 121, the step-down gate line 123, and the first to third gate electrodes 124h, 124l, and 124c.

Next, a gate insulating layer 140 may be formed on the entire surface of the substrate 110 with the gate line 121, the step-down gate line 123, the first to third gate electrodes 124h, 124l, and 124c, and the storage electrode line 131 by using an inorganic insulating material such as a silicon oxide (SiOx) or a silicon nitride (SiNx). The gate insulating layer 140 may be formed as a single layer or a multilayer.

Next, a first semiconductor 154h, a second semiconductor 154l, and a third semiconductor 154c may be formed by depositing and then patterning a semiconductor material such as amorphous silicon, polycrystalline silicon, and a metal oxide on the gate insulating layer 140. The first semiconductor 154h may be arranged on the first gate electrode 124h, the second semiconductor 154l may be arranged on the second gate electrode 124l, and the third semiconductor 154c may be arranged on the third gate electrode 124c.

Next, a data line 171 extending in a second direction substantially perpendicular to the first direction may be formed by depositing and then patterning a metal material. The metal material may be a single layer or a multilayer.

Further, a first source electrode 173h protruding above the first gate electrode 124h from the data line 171, and a first drain electrode 175h spaced apart from the first source electrode 173h may be formed together. A second source electrode 173l connected to the first source electrode 173h, and a second drain electrode 175l spaced apart from the second source electrode 173l may be formed together. A third source electrode 173c extending from the second drain electrode 175l, and a third drain electrode 175c spaced apart from the third source electrode 173c may be formed together.

The first to third semiconductors 154h, 154l, and 154c, the data line 171, the first to third source electrodes 173h, 173l, and 173c, and the first to third drain electrodes 175h, 175l, and 175c may be formed by sequentially depositing and then simultaneously patterning a semiconductor material and a metal material. In this case, the first semiconductor 154h may extend to the lower portion of the data line 171.

The first, second, and third gate electrodes 124h, 124l, and 124c, the first, second, and third source electrodes 173h, 173l, and 173c, and the first, second, and third drain electrodes 175h, 175l, and 175c may form first, second, and third thin-film transistors (TFTs) Qh, Ql, and Qc, together with the first, second, and third semiconductors 154h, 154l, and 154c.

Next, a passivation layer 180 may be formed on the data line 171, the first to third source electrodes 173h, 173l, and 173c, the first to third drain electrodes 175h, 175l, and 175c, and the semiconductors 154h, 154l, and 154c exposed between the respective source electrodes 173h, 173l, and 173c and the respective drain electrodes 175h, 175l, and 175c. The passivation layer 180 may include an organic insulating material or an inorganic insulating material, and may be formed as a single layer or a multilayer.

Next, a color filter 230 may be formed in each pixel area PX on the passivation layer 180. The color filter 230 may be formed in each of the first subpixel area PXa and the second subpixel area PXb, and may not be formed at the first valley V1. Further, the color filters 230 having the same color may be formed in a column direction of the pixel areas PX. When forming the color filters 230 having three different colors, a first colored color filter 230 may first be formed and then a second colored color filter 230 may be formed by shifting a mask. Next, after the second colored color filter 230 is formed, a third colored color filter 230 may be formed by shifting the mask.

Next, a light blocking member 220 may be formed on a boundary of each pixel area PX on the passivation layer 180 and the thin-film transistor. The light blocking member 220 may be formed at the first valley V1 arranged between the first subpixel area PXa and the second subpixel area PXb.

Next, a first insulating layer 240 including an inorganic insulating material such as a silicon nitride (SiNx), a silicon oxide (SiOx), and a silicon oxynitride (SiOxNy) may be formed on the color filter 230 and the light blocking member 220.

According to an exemplary embodiment of the present invention, the color filter 230 may be formed after forming the light blocking member 220, or the light blocking member 220 may be formed after forming the color filter 230 and the first insulating layer 240.

Next, a first contact hole 185h may be formed by etching the passivation layer 180, the light blocking member 220, and the first insulating layer 240, to expose a portion of the first drain electrode 175h. A second contact hole 185l may be formed to expose a portion of the second drain electrode 175l.

Next, a first subpixel electrode 191h may be formed in the first subpixel area PXa, and a second subpixel electrode 191l may be formed in the second subpixel area PXb, by depositing and then patterning a transparent metal material such as indium tin oxide (ITO) and indium zinc oxide (IZO) on the first insulating layer 240. The first subpixel electrode 191h and the second subpixel electrode 191l may be separated from each other with the first valley V1 therebetween. The first subpixel electrode 191h may be connected to the first drain electrode 175h through the first contact hole 185h, and the second subpixel electrode 191l may be connected to the second drain electrode 175l through the second contact hole 185l.

Horizontal stems 193h and 193l, and vertical stems 192h and 192l crossing the horizontal stems 193h and 193l, may be formed at the first subpixel electrode 191h and the second subpixel electrode 191l, respectively. Further, minute branches 194*h* and 194*l* obliquely extending from the horizontal stems 193*h* and 193*l* and the vertical stems 192*h* and 192*l* may be formed.

Figure 6:
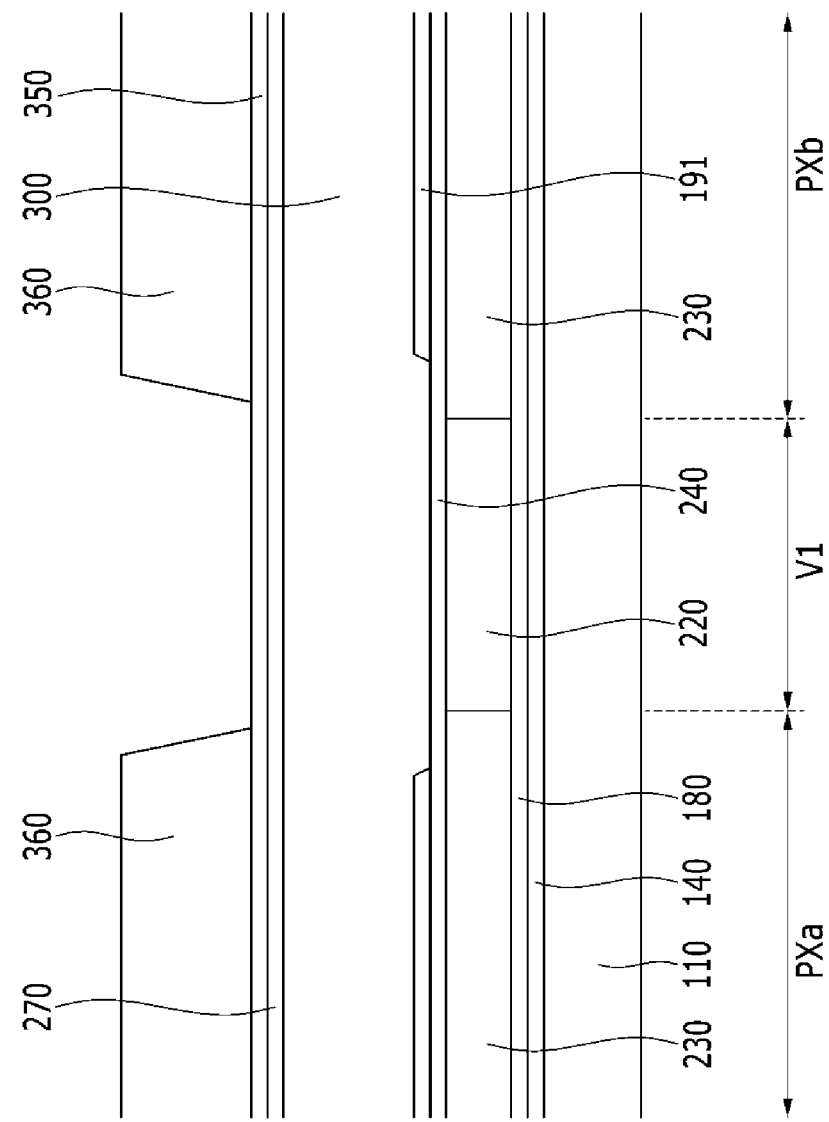

Referring to FIG. 6, a sacrificial layer 300 may be formed by coating a photosensitive organic material on the pixel electrode 191 and performing a photolithography process.

The sacrificial layers 300 may be patterned to be connected to each other along the pixel columns. More particularly, the sacrificial layer 300 may cover each pixel area PX, and formed to cover the first valley V1 arranged between the first subpixel area PXa and the second subpixel area PXb.

Next, a common electrode 270 may be formed by depositing a transparent metal material such as indium tin oxide (ITO) and indium zinc oxide (IZO) on the sacrificial layer 300.

Next, the second insulating layer 350 may be formed on the common electrode 270 with an inorganic insulating material such as a silicon oxide, a silicon oxide (SiOx), and a silicon oxynitride (SiOxNy).

Next, the roof layer 360 may be formed by coating and patterning an organic material on the second insulating layer 350. In this case, the organic material arranged at the first valley V1 may be patterned so as to be removed. As a result, the roof layers 360 may be formed to be connected to each other along pixel rows.

Figure 7:
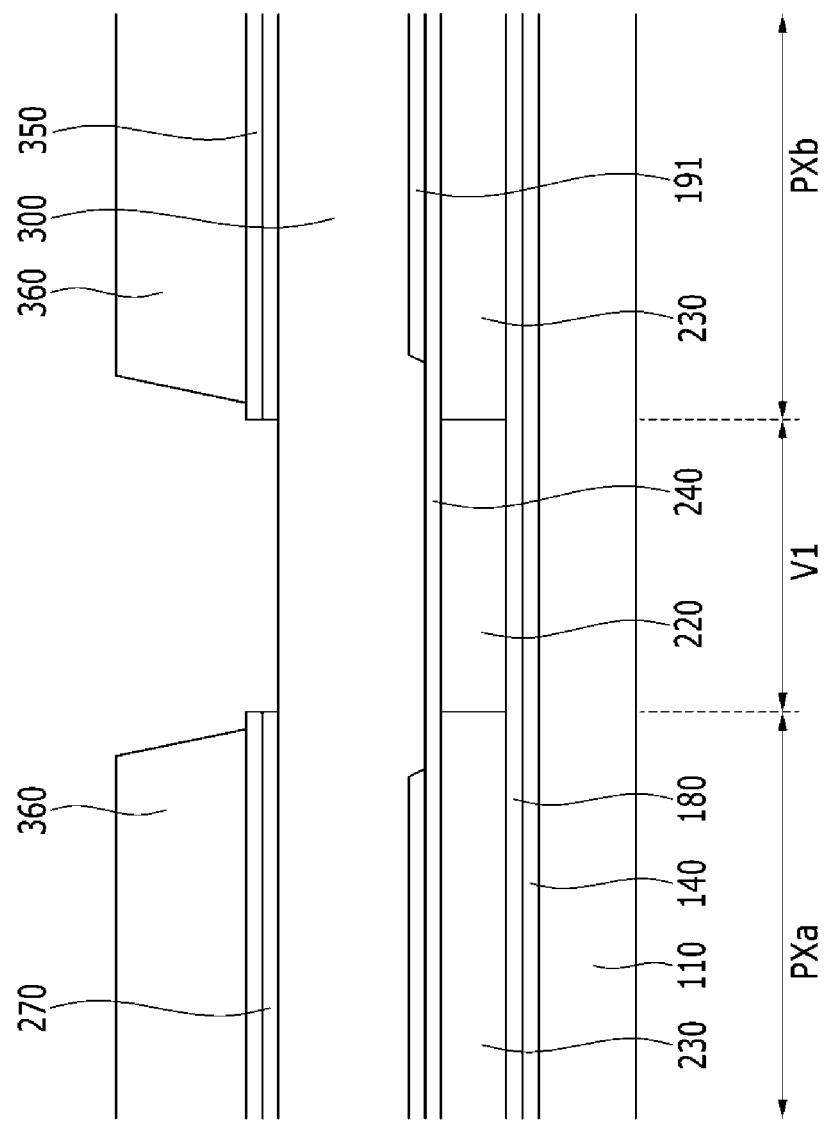

Next, as shown in FIG. 7, the second insulating layer 350 and the common electrode 270 may be patterned by using the roof layer 360 as a mask. The second insulating layer 350 may be dry-etched by using the roof layer 360 as a mask, and the common electrode 270 may be wet-etched.

Figure 8:
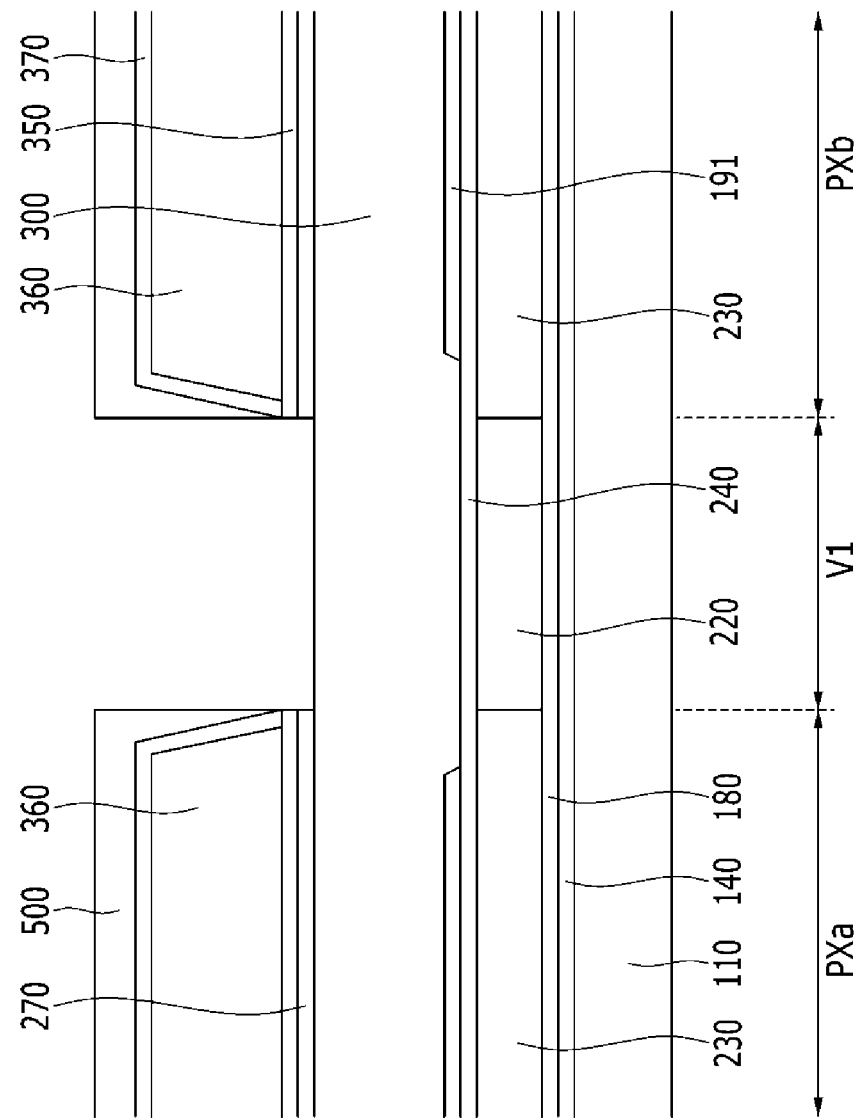

Next, as illustrated in FIG. 8, a third insulating layer 370 including an inorganic insulating material such as a silicon nitride (SiNx), a silicon oxide (SiOx), and a silicon oxynitride (SiOxNy) may be formed on the roof layer 360.

Next, a photoresist 500 may be coated on the third insulating layer 370, and the photoresist 500 may be patterned by a photolithography process. In this case, the photoresist 500 arranged at the first valley V1 may be removed. The third insulating layer 370 may be etched by using the patterned photoresist 500 as a mask. More particularly, the third insulating layer 370 arranged at the first valley V1 may be removed.

The third insulating layer 370 may be formed to cover the upper surface and the side of the roof layer 360 to protect the roof layer 360. The pattern of the third insulating layer 370 may be arranged outside of the pattern of the roof layer 360.

The pattern of the second insulating layer 350 may be the same as the pattern of the third insulating layer 370. Alternatively, the pattern of the second insulating layer 350 may be formed inside of the pattern of the roof layer 360. In this case, the third insulating layer 370 may be formed to contact the second insulating layer 350.

Equipment for patterning the roof layer 360 may be different from equipment for patterning the third insulating layer 370, and an arrangement error between the equipment may increase a difference between the patterns of the third insulating layer 370 and the roof layer 360. In this case, a portion where the pattern of the third insulating layer 370 is positioned outside of the pattern of the roof layer 360 may sag or break, but since the third insulating layer 370 is not formed of a conductive material, a short circuit may not occur between the third insulating layer 370 and the pixel electrode 191.

Figure 9:
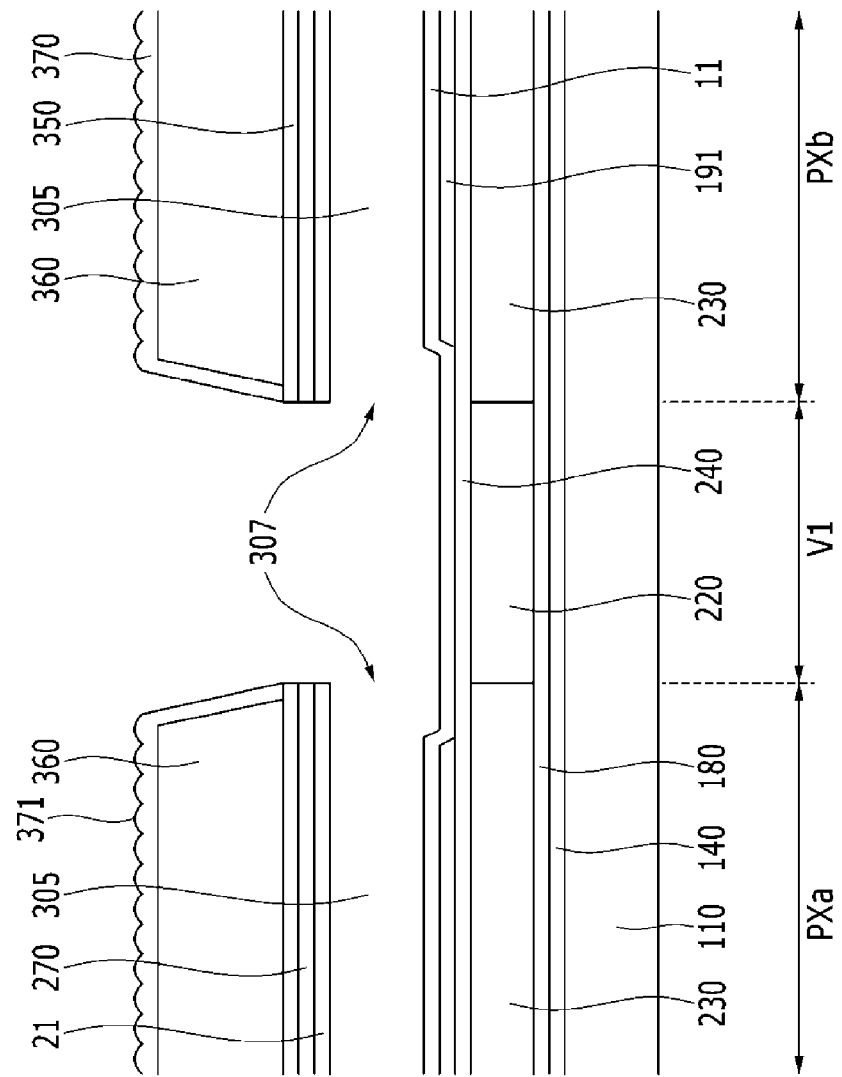

As shown in FIG. 9, the sacrificial layer 300 may be fully removed by supplying a developer and a stripper solution on the substrate 110 where the sacrificial layer 300 is exposed, or by using an ashing process.

When the sacrificial layer 300 is removed, the microcavity 305 may be generated in a region where the sacrificial layer 300 positioned.

The pixel electrode 191 and the common electrode 270 may be spaced apart from each other with the microcavity 305 therebetween, and the pixel electrode 191 and the roof layer 360 may be spaced apart from each other with the microcavity 305 therebetween. The common electrode 270 and the roof layer 360 may be formed to cover the upper surface and both sides of the microcavity 305.

The microcavity 305 may be exposed through an injection hole 307, that is, a portion where the roof layer 360, the second insulating layer 350, and the common electrode 270 are removed. The injection hole 307 may be formed along the first valley V1. For example, injection holes 307 may be formed to face each other at the edges of the first subpixel area PXa and the second subpixel area PXb. More particularly, the injection holes 307 may correspond to the lower side of the first subpixel area PXa and the upper side of the second subpixel area PXb to expose the side of the microcavity 305. Alternatively, the injection hole 307 may also be formed along the second valley V2.

Next, a first convex embossing pattern 371 may be formed in the upper surface of the third insulating layer 370. The first convex embossing pattern 371 may be formed through a photolithography process.

According to an exemplary embodiment of the present invention, a cross-sectional view of the first convex embossing pattern 371 may have a semicircle shape, and the first convex embossing pattern 371 may be formed to have an embossing shape throughout the upper surface of the third insulating layer 370.

Next, the roof layer 360 may be cured by applying heat to the substrate 110 in order to maintain the shape of the microcavity 305 by the roof layer 360.

Next, an aligning agent containing an alignment material may be applied on the substrate 110 by a spin coating method or an inkjet method, to inject the aligning agent into the microcavity 305 through the injection hole 307. When the aligning agent is injected into the microcavity 305 followed by a curing process, a solution component may evaporate while the alignment material remains on a wall surface in the microcavity 305.

Accordingly, the first alignment layer 11 may be formed on the pixel electrode 191, and the second alignment layer 21 may be formed below the lower insulating layer 350. The first alignment layer 11 and the second alignment layer 21 may be formed to face each other with the microcavity 305 therebetween, and connected to each other at the edge of the pixel area PX.

The first and second alignment layers 11 and 21 may be aligned in a vertical direction to the substrate 110, except at the side of the microcavity 305. In addition, the first and second alignment layers 11 and 21 may be aligned in a horizontal direction to the substrate 110 by irradiating UV rays to the first and second alignment layers 11 and 21.

Next, the liquid crystal material including the liquid crystal molecules 310 may be provided on the substrate 110 by an inkjet method or a dispensing method to inject the liquid crystal material into the microcavity 305 through the injection hole 307. In this case, a liquid crystal material may be provided in the injection hole 307 formed along the odd-numbered first valleys V1, and not in the injection hole 307 formed along the even-numbered first valleys V1. Alternatively, the liquid crystal material may be provided in the injection hole 307 formed along the even-numbered first valleys V1, and not in the injection hole 307 formed along the odd-numbered first valleys V1.

When the liquid crystal material is provided in the injection holes 307 formed along the odd-numbered first valleys V1, the liquid crystal material may be injected into the microcavity 305 through the injection hole 307 by capillary force. The liquid crystal material is injected into the microcavity 305 by discharging air in the microcavity 305 through the injection hole 307 formed along the even-numbered first valleys V1.

The liquid crystal material may be provided in all of the injection holes 307. More particularly, the liquid crystal material may be provided in all injection holes 307 formed along the odd-numbered first valleys V1 and the injection holes 307 formed along the even-numbered first valleys V1.

Figure 10:
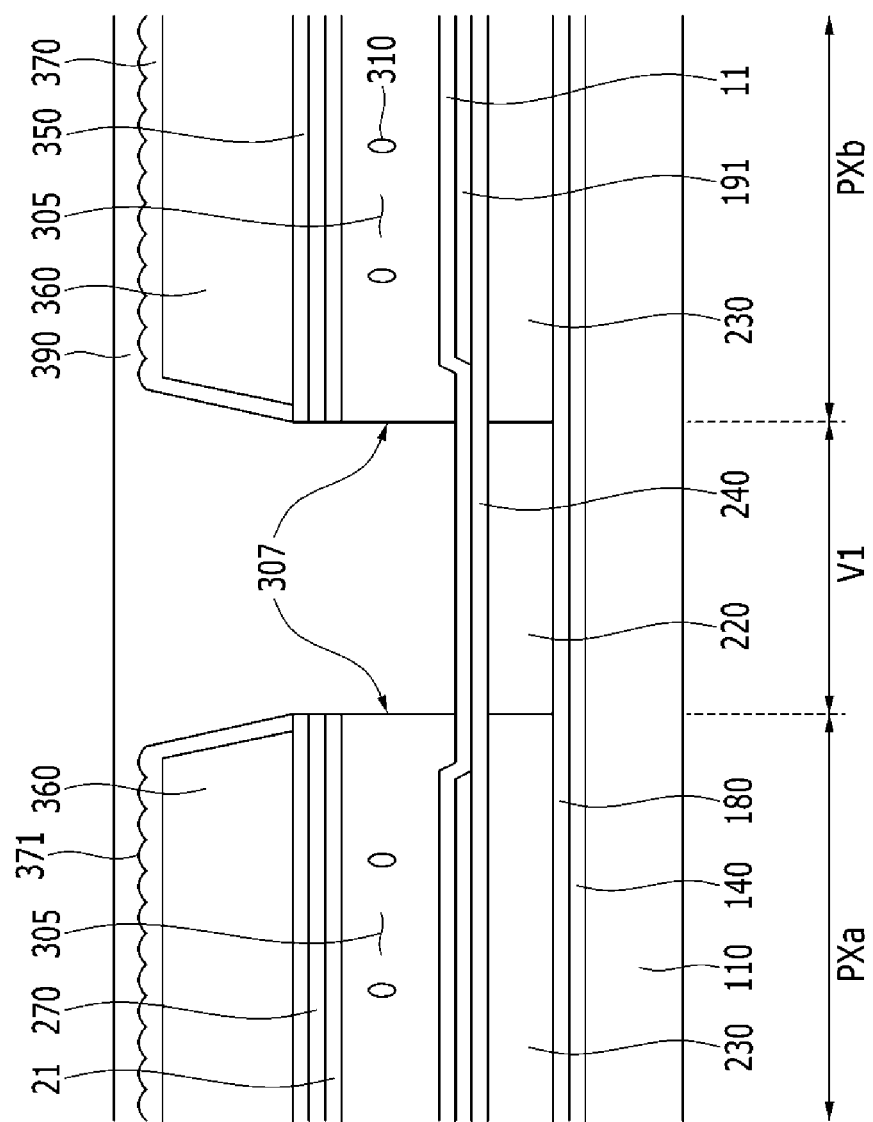

As shown in FIG. 10, an overcoat 390 may be formed by depositing a material that does not react with the liquid crystal molecules 310, on the upper insulating layer 370. The overcoat 390 may cover the injection hole 307 that exposes the microcavity 305, to seal the microcavity 305.

The third insulating layer 370 and the overcoat 390 disposed on the third insulating layer 370 may have different refractive indices. When light passes through layers having a different refractive index from each other, a range of angle that the light may pass is referred to as a critical angle. In general, the critical angle may decrease when light passes from a layer having a high refractive index to a layer having a low refractive index. The critical angle may further decrease when a refractive index difference between the layers increases, such that light incident with an angle that exceeds the critical angle may not pass through the layers, thereby decreasing light efficiency of a display device.

As previously described, the inorganic insulating material such as a silicon nitride (SiNx), a silicon oxide (SiOx), a silicon oxynitride (SiOxNy), which may be included in the third insulating layer 370 may have a higher refractive index than a material such as parylene that may be included in the overcoat 390. Accordingly, a critical angle for transmission of light passing through the third insulating layer 370 may be generated. In addition, as the refractive index difference between the third insulating layer 370 and the overcoat 390 is increased, the critical angle may decrease further that may further decrease light efficiency.

Thus, as described above, the first convex embossing pattern 371 may be formed in the third insulating layer 370 to increase the critical angle of light passing through the upper surface of the third insulating layer 370 and a lower surface of the overcoat 390 to increase light efficiency, so that light efficiency of the entire display device may improve compared to a display device including a third insulating layer 370 without the first convex embossing pattern 371.

Although not illustrated, polarizers may be further formed on upper and lower surfaces of the liquid crystal display. The polarizers may include a first polarizer and a second polarizer. The first polarizer may be attached onto the lower surface of the substrate 110, and the second polarizer may be attached onto the color filter 230.

Next, a display device according to an exemplary embodiment of the present invention will be described with reference to FIG. 11 and FIG. 12. The display device according to the present exemplary embodiment includes elements substantially similar to the display device illustrated with reference to FIGS. 1 to 10, and repeated description of the substantially similar elements and operations will be omitted.

Figure 11:
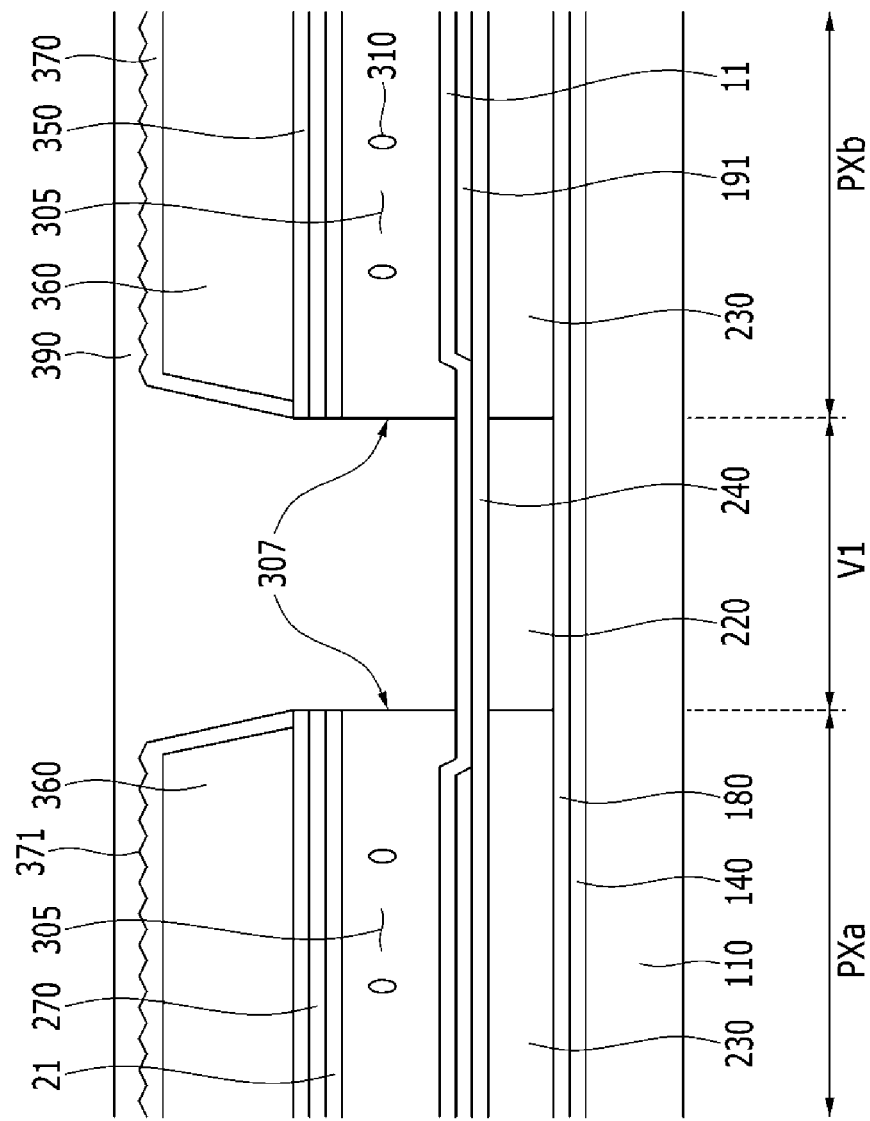
FIG. 11 is a cross-sectional view of a display device according to an exemplary embodiment of the present invention.

Referring to FIG. 11, in a display device according to an exemplary embodiment of the present invention, a cross-sectional view of a first convex embossing pattern 371 of a third insulating layer 370 may have a triangle shape with an embossing-type pattern.

Figure 12:
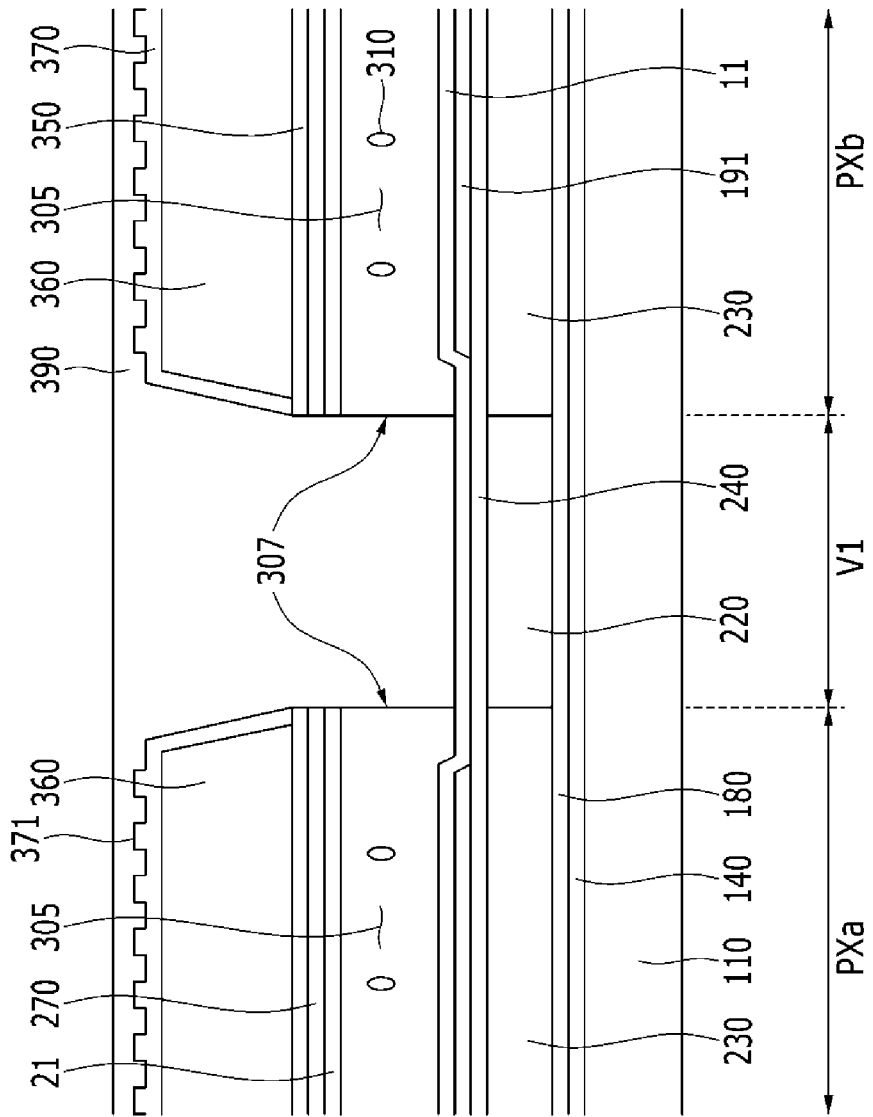
FIG. 12 is a cross-sectional view of a display device according to an exemplary embodiment of the present invention.

In addition, referring to FIG. 12, in a display device according to an exemplary embodiment of the present invention, a cross-sectional view of a first convex embossing pattern 371 of a third insulating layer 370 may have a quadrangle shape with an embossing-type pattern.

As described, the cross-sectional view of the first convex embossing pattern 371 may have a semicircle, a triangle, or a quadrangle shape. According to an exemplary embodiment of the present invention, the first convex embossing pattern 371 may include one or more of the semicircle, triangle, and quadrangle shape. Alternatively, cross-sectional view of the first convex embossing pattern 371 may have any shapes with a side wall, such as a trapezoid or a parallelogram.

A display device according to an exemplary embodiment of the present invention will be described with reference to FIG. 13 and FIG. 14. The display device according to the present exemplary embodiment includes elements substantially similar to the display device illustrated with reference to FIG. 1 to FIG. 10, and repeated description of the substantially similar elements and operations will be omitted.

Figure 13:
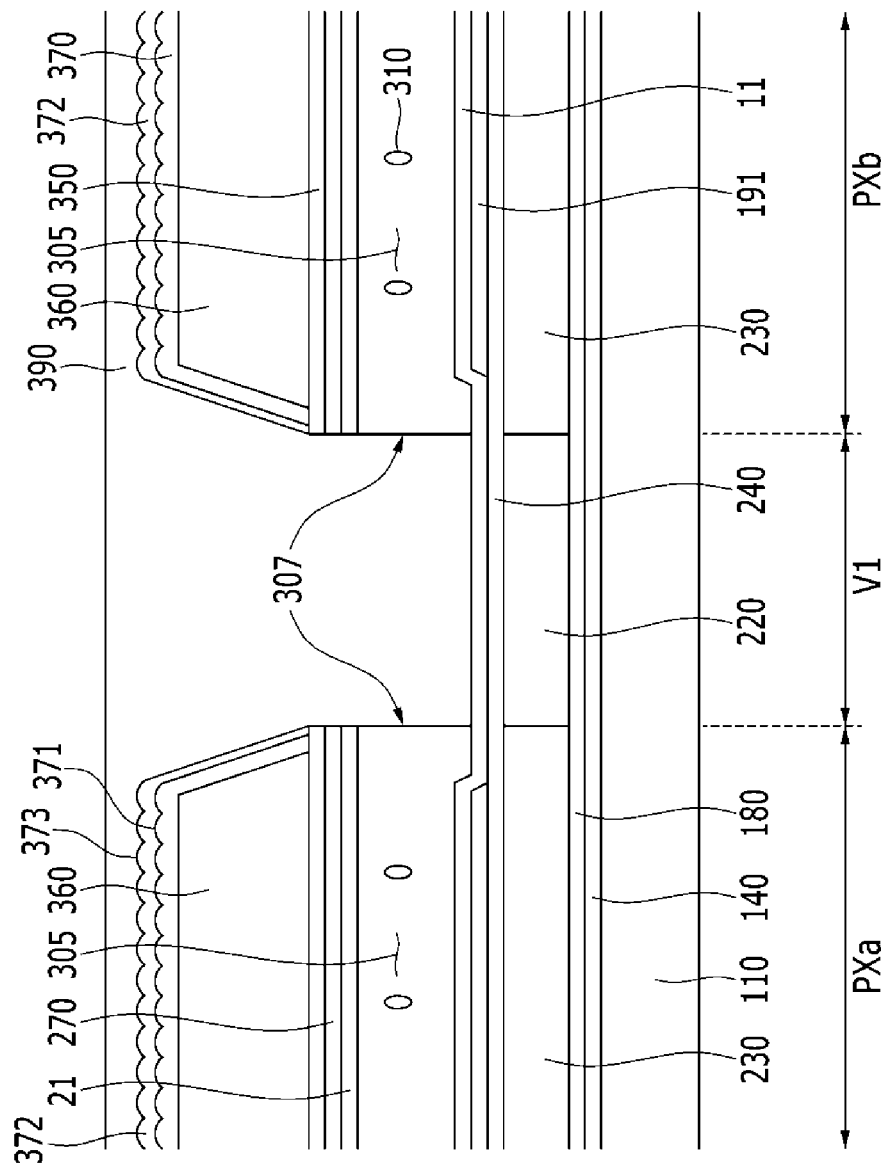
FIG. 13 is a cross-sectional view of a display device according to an exemplary embodiment of the present invention.

Referring to FIG. 13, a display device according to an exemplary embodiment of the present invention may further include a refractive index easing layer 372 formed between an upper surface of a third insulating layer 370 and a bottom surface of an overcoat 390. A first convex embossing pattern 371 may be formed in the third insulating layer 370.

A second convex embossing pattern 373 similar to the first convex embossing pattern 371 of the third insulating layer 370 having a semicircle, a triangle, or a quadrangle shape may be formed in refractive index easing layer 372. According to an exemplary embodiment of the present invention, the second convex embossing pattern 373 may include one or more of the semicircle, triangle, and a quadrangle shape.

The refractive index easing layer 372 may include a material that has a refractive index lower than that of the third insulating layer 370 formed below the refractive index easing layer 372, and higher than that of the overcoat 390 formed above the refractive index easing layer 372. Such material may include a transparent conductive oxide, indium zinc oxide (IZO), indium tin oxide (ITO), aluminum doped zinc oxide (AZO), or fluorine doped tin oxide (FTO).

When the first convex embossing pattern 371 of the insulating layer 370 and the second convex embossing pattern 373 of the refractive index easing layer 372 are formed as a dual structure, a critical angle of transmitting light may increase more efficiently, thereby further improving light efficiency.

Figure 14:
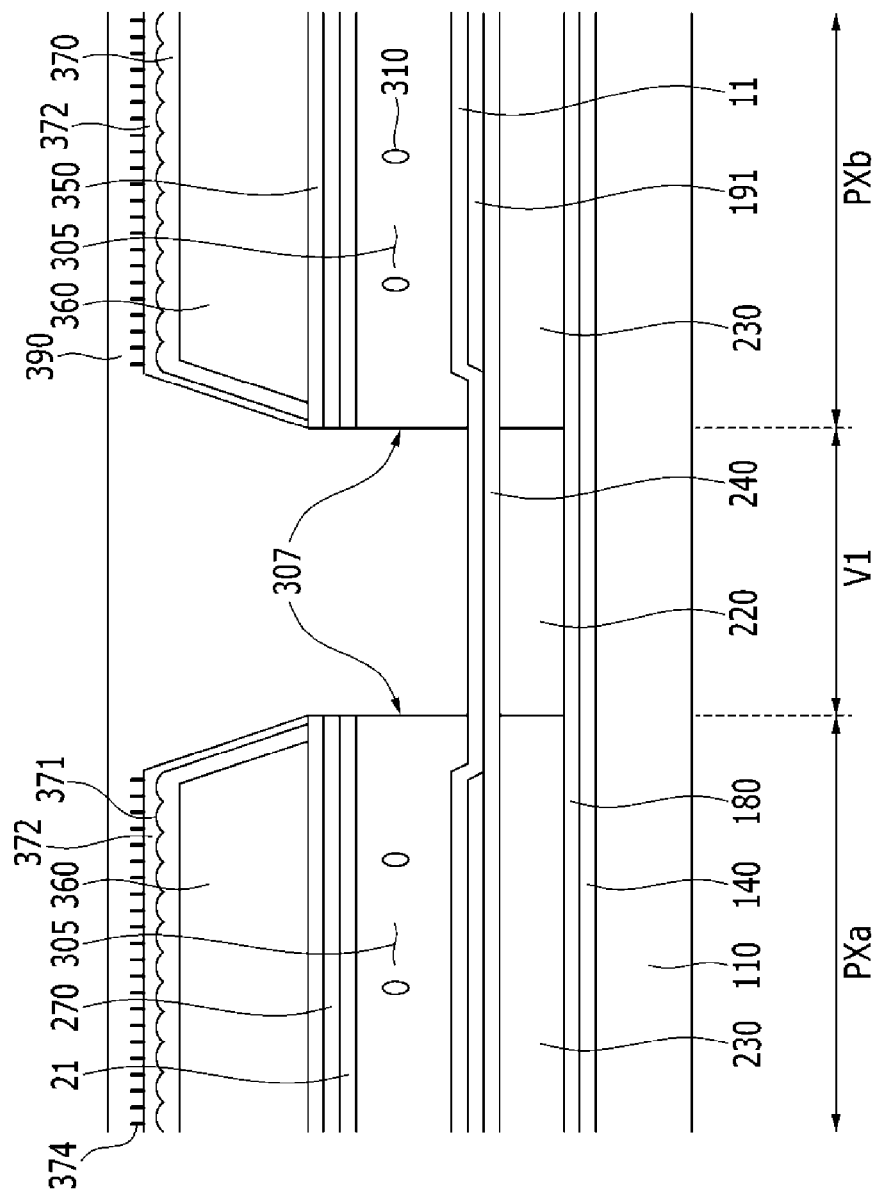
FIG. 14 is a cross-sectional view of a display device according to an exemplary embodiment of the present invention.

Referring to FIG. 14, in a display device according to an exemplary embodiment of the present invention, a second convex embossing pattern 373 of a refractive index easing layer 372 may include a nanowire 374.

In general, a nanowire may not be grown in an inorganic insulating material used in the third insulating layer 370, but when the refractive index easing layer 372 includes a transparent conductive oxide on the third insulating layer 370, the nanowire 374 may be grown and formed in an upper surface of the refractive index easing layer 372 including a transparent conductive oxide, to increase light efficiency similarly to the second convex embossing pattern 373 formed in an upper surface of the refractive index easing layer 372.

According to the exemplary embodiments of the present invention, an insulating layer including various types of patterns may increase a critical angle of light that may pass through layers having a different refractive index, to improve light efficiency.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A display device, comprising:
a substrate comprising pixel areas;
a thin-film transistor disposed on the substrate;
a first insulating layer disposed on the thin-film transistor;
a pixel electrode disposed on the first insulating layer and connected to the thin-film transistor;
a liquid crystal layer filling a microcavity disposed on the pixel electrode;
a common electrode spaced apart from the pixel electrode by the microcavity;
a roof layer disposed on the common electrode;
an injection hole disposed in the common electrode and the roof layer, the injection hole partially exposing the microcavity;
a third insulating layer disposed on the roof layer; and
an overcoat disposed on the third insulating layer and sealing the microcavity by covering the injection hole,
wherein a first convex embossing pattern is formed in an upper surface of the third insulating layer.

2. The display device of claim 1, wherein the third insulating layer comprises an inorganic material.

3. The display device of claim 2, wherein the third insulating layer comprises at least one of silicon nitride (SiNx), silicon oxide (SiOx), and silicon oxynitride (SiOxNy).

4. The display device of claim 2, wherein the overcoat comprises a material having a refractive index lower than a refractive index of the third insulating layer.

5. The display device of claim 4, wherein a cross-section of the first convex embossing pattern comprises a semicircle, a triangle, or a quadrangle shape.

6. The display device of claim 4, further comprising a refractive index easing layer disposed between the third insulating layer and the overcoat,
wherein a second convex embossing pattern is formed in an upper surface of the refractive index easing layer.

7. The display device of claim 6, wherein the refractive index of the refractive index easing layer is lower than the refractive index of the third insulating layer and higher than the refractive index of the overcoat.

8. The display device of claim 7, wherein the refractive index easing layer comprises a transparent conductive oxide.

9. The display device of claim 8, wherein the transparent conductive oxide comprises indium zinc oxide (IZO), indium tin oxide (ITO), aluminum doped zinc oxide (AZO), or fluorine doped tin oxide (FTO).

10. The display device of claim 9, wherein a cross-section of the second convex embossing pattern comprises at least one of a semicircle, a triangle, and a quadrangle shape.

11. The display device of claim 9, wherein the second convex embossing pattern comprises a nanowire.

12. The display device of claim 1, further comprising:
a second insulating layer disposed between the common electrode and the roof layer; and
an alignment layer disposed in the microcavity and on the entire surface of the injection hole.

13. A method for manufacturing a display device, comprising:
forming a thin-film transistor on a substrate;
forming a first insulating layer on the thin-film transistor;
forming a pixel electrode on the first insulating layer, the pixel electrode being connected to the thin-film transistor formed on the first insulating layer;
forming a sacrificial layer on the pixel electrode;
forming a common electrode on the sacrificial layer;
forming a roof layer by coating an organic material on the common electrode and patterning the coated organic material;
exposing the sacrificial layer by patterning the common electrode using the roof layer as a mask;
forming a third insulating layer on the roof layer;
forming a microcavity and an injection hole between the pixel electrode and the common electrode by removing the exposed sacrificial layer;
forming a first convex embossing pattern in an upper surface of the third insulating layer;
forming a liquid crystal layer by injecting a liquid crystal material into the microcavity; and
sealing the microcavity by forming an overcoat on the third insulating layer and the injection hole.

14. The method of claim 13, wherein the third insulating layer comprises an inorganic material comprising at least one of silicon nitride (SiNx), silicon oxide (SiOx), and silicon oxynitride (SiOxNy).

15. The method of claim 14, wherein:
the overcoat comprises a material having a refractive index lower than a refractive index of the third insulating layer; and
the overcoat comprises parylene.

16. The method of claim 15, wherein a cross-section of the first convex embossing pattern comprises at least one of a semicircle, a triangle, and a quadrangle shape.

17. The method of claim 15, further comprising, after forming the first convex embossing pattern on the third insulating layer:
forming a refractive index easing layer on the third insulating layer; and
forming a second convex embossing pattern on an upper surface of the refractive index easing layer.

18. The method of claim 17, wherein:
the refractive index easing layer comprises a material having a refractive index lower than the refractive index of the third insulating layer and higher than the refractive index of the overcoat; and
the refractive index easing layer comprises indium zinc oxide (IZO), indium tin oxide (ITO), aluminum doped zinc oxide (AZO), or fluorine doped tin oxide (FTO).

19. The method of claim 18, wherein forming the second convex embossing pattern in the refractive index easing layer comprises growing a nanowire in a surface of the refractive index easing layer.

20. The method of claim 13, further comprising:
forming a second insulating layer on the common electrode before forming the roof layer; and
forming an alignment layer in the microcavity and on a surface of the injection hole by injecting an aligning material into the microcavity through the injection hole, before forming the liquid crystal layer.